UNITED STATES PATENT OFFICE.

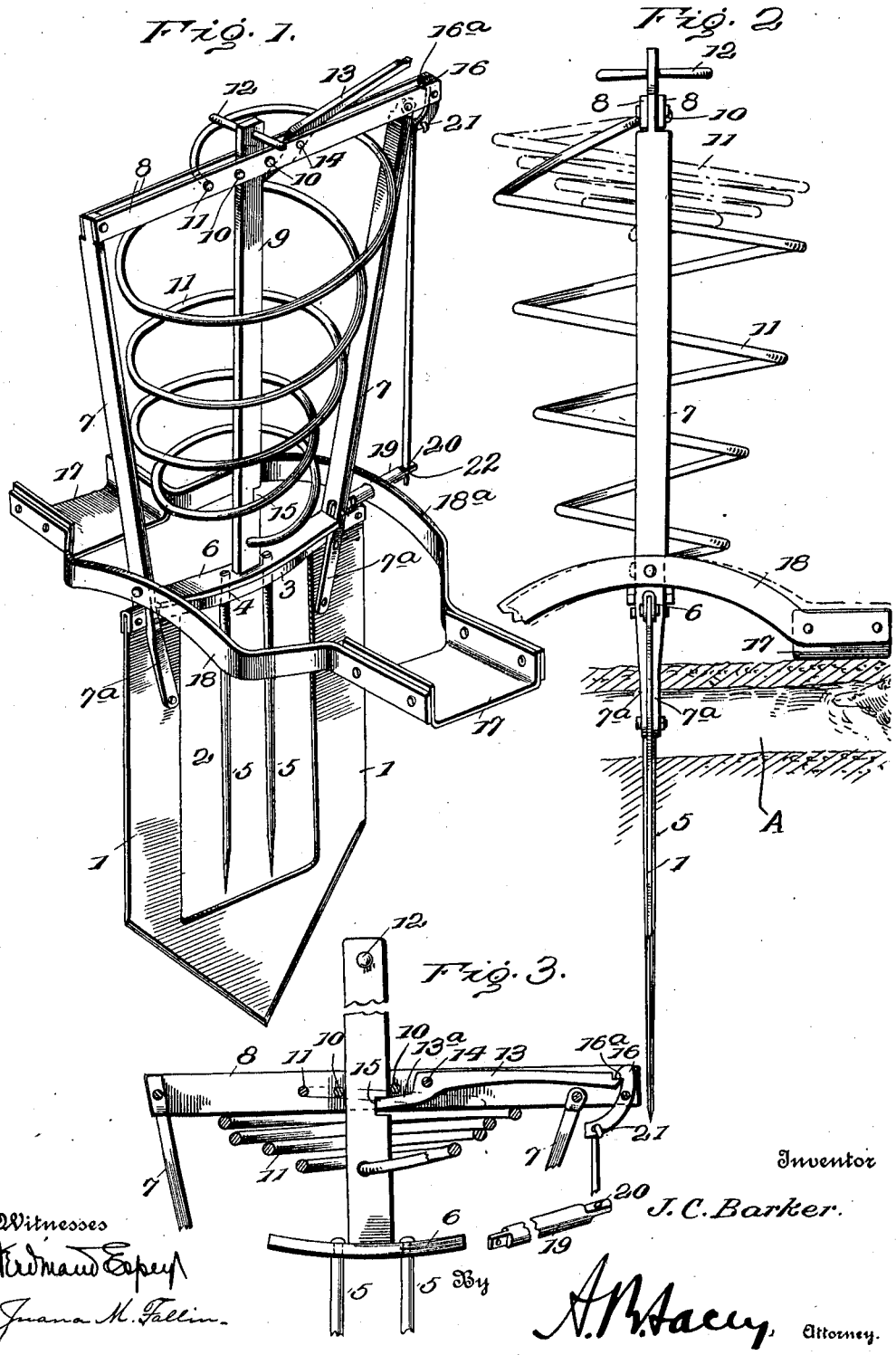

JOSEPH C. BARKER, OF OBLONG, ILLINOIS.

MOLE-TRAP.

1,031,229.  Specification of Letters Patent.  Patented July 2, 1912.

Application filed December 12, 1911. Serial No. 665,361.

*To all whom it may concern:*

Be it known that I, JOSEPH C. BARKER, a citizen of the United States, residing at Oblong, in the county of Crawford and State of Illinois, have invented certain new and useful Improvements in Mole-Traps, of which the following is a specification.

This invention relates to animal traps and more particularly to that class of devices known as mole traps.

It is the purpose of the invention to provide a mole trap, the construction of which is such as to insure ease and cheapness in its manufacture, and durability and strength and efficiency in use.

The main object of the invention is the provision of a simple mole trap having depending spring actuated impaling prongs operated in a novel manner through coacting plates disposed above the path of the quarry on each side of the trap.

Further objects and advantages will appear in the following description, it being understood that various changes in the form, proportion, and minor details of construction may be resorted to within the scope of the appended claims.

For a full understanding of the invention and the merits thereof, reference is to be had to the following description and the accompanying drawings in which:—

Figure 1 is a perspective view of the improved mole trap. Fig. 2 is a side elevation of the trap. Fig. 3 is a side view of the upper portion of the trap, the prongs being in a raised position and the parts slightly broken away to show the construction of the locking mechanism.

Corresponding and like parts are referred to in the following description and indicated in all the views of the accompanying drawings by the same reference characters.

For the purpose of illustration, the improved mole trap of this invention is shown disposed above a mole burrow A. The device includes an anchoring member, preferably in the form of a blade portion 1 adapted to enter the ground and act as a support to the trap, said blade being cut away at 2 to form a recess so as not to obstruct the burrow A.

Spanning the recess 2 and connecting the sides of the blade is a bridge 3 pierced by guiding apertures 4 through which pass impaling prongs 5, which latter are secured to a bar 6 disposed above the bridge. The prongs 5 are adapted to operate within the recess 2. A frame or yoke embodying spaced, upwardly diverging arms 7 connected at their upper terminals by a transverse bar 8, is secured to the blade 1 on each side of the recess 2, the lower end of each arm being preferably bifurcated as at 7ᵃ so as to embrace the blade 1, and the bar 8 of the yoke being constructed preferably of two spaced members between which the arms 7 are secured. A guide rod 9 is rigidly attached to the bar 6 and passes upwardly between the sides of the bar 8, being secured in the center thereof by transverse pins 10 disposed on each side of the rod.

A coiled spring 11 encircles the rod 9 and is rigidly secured thereto at its lower end, the upper end thereof being attached to the bar 8 so that the spring tends to depress the rod 9 to which the prongs 5 are connected until the bar 6 strikes against the bridge 3 at which time the prongs have pierced the burrow A. The intervention of the bridge 3 at this point in the movement of the prongs prevents the latter from striking the lower portion of the blade 1 and becoming dulled thereby. The prongs may be raised and the trap set by raising the rod 9 against the tension of the spring which is readily done by drawing up on a transverse pin 12 extending through the upper end of the rod to afford a hand-hold during this act.

In order to retain the trap in a set position at which time the coils of the spring 11 bear against the bar 8, an angular locking lever 13 cut away at 13ᵃ to accommodate the adjacent pin 10 is pivoted at 14 between the sides of the bar 8, engages a notch 15 in the adjacent side of the rod 9 and is held in engagement therewith and in depressed position by a pivoted angular catch 16 having an overhanging lip 16ᵃ, said catch being mounted between the sides of the bar 8 outside of the adjacent arm 7, the bar being extended for this purpose.

A tripping mechanism is adapted to be operated by the quarry from either side of the trap and embodies an actuating yoke preferably formed of two spaced members or plates 17 which are disposed above the upper wall of the burrow A, said plates being connected preferably by upwardly curved angular rods 18 and 18ᵃ which are journaled at their mid portions, the rod 18 directly to the adjacent rod 7 above the blade 1, the rod 18ª on a pin 19 intermediate the ends thereof, said pin being in turn pivoted for vertical movement to the rod 7 which is adjacent to the catch 16, the pivoted end of said pin being preferably disposed between the bifurcations of the adjacent rod 7. The free end of the pin 19 is pierced by an aperture 20 in which is slidably mounted a connecting rod 21, the upper end of which is pivoted to the lower end of the catch 16, the lower end of the rod 21 being provided with a stop shoulder 22 bearing against the pin 19 and spaced from the extremity of the rod so that the rod may have slight movement independently of the pin 19 and thus permit the catch 16 to readily engage the lever 13. It will here be noted that the upper end of the rod 21 further acts as a stop to prevent the catch 16 from entering the space between the sides of the bar 8 since the terminal of said rod is preferably angularly disposed and passed through said catch, thus holding the catch in an operative position.

In using the device the supporting blade 1 is forced into the ground so that the burrow A passes through the recess 2 and one of the plates 17 presses down on the upper wall of the burrow on each side of the trap. The rod 9 carrying the prongs 5 is then raised against the tension of the spring 11 and the notch 15 is engaged by the inner end of the lever 13 which is thereafter secured in this engagement by the catch 16.

Now it will be seen that when the quarry in passing through the burrow attempts to go under either of the plates 17, said plate will be raised and the other plate acts as a fulcrum so that the pin 19 is pivoted upwardly and strikes the shoulder 22 of the connecting rod 21, which latter in turn pivots the catch 16 about its axis and the lever 13 is thereby released. The tension of the spring 11 now forcibly drives the prongs 5 downwardly and the animal is impaled thereon.

It will here be noted that the spring 11 is mounted in the yoke without the use of solder, screws or other fastening devices, the upper terminal of the spring being passed through both portions of the bar 8 and the lower terminal being passed through an aperture in the rod 9.

It is desired to particularly direct the attention to the manner of mounting the rods 18 and 18ª, the former being loosely pivoted to the adjacent portion of the frame, the rod 18ª being loosely mounted upon the pin 19 so as to adjust itself thereon with the movement of said pin. It will also be noted that the portion of the blade or anchoring member adjacent to the pin 19 acts as a stop thereto and prevents said pin from becoming disengaged from the connecting rod 21, and the upper end of said rod constitutes a stop for the catch 16 and prevents the latter from alining itself with the frame in such a position that the overhanging lip 16ª is beyond the radius of engagement with the lever 13.

Further attention is directed to the method of attaching the bridge 3, the ends of which are preferably formed to embrace the upper end of the blade 1 and are secured thereto. The bifurcations 7ª of the rods 7 are attached to the blade 1 outside of the ends of the bridge 3 and thus insure the retention of the latter in its proper position.

Although the device is here shown with two prongs, it is of course to be understood that a plurality of prongs attached to the bar 6 would in no wise alter the operation of the device.

When the trap is in position about a mole passageway the top wall of the passageway is first broken down and the plates 17 are positioned so that they are spaced for a distance of about one inch from the said broken down wall of the passageway. As the animal comes through the passageway in either direction it will force up the top wall of the passageway so that it comes in contact with one of the plates and moves the same in an upward direction so that the other plate is brought down in contact with the broken down top wall of the passageway. As the animal completes the repair of the broken down wall of the passageway, it arrives at the other plate 17 and swings the same in an upward direction, but by reason of the fact that the plate 17 which has first been elevated is now resting upon the top wall of the passageway the said wall serves as a fulcrum and the rod 18ª is then converted into a lever which lifts the free end portion of the pin 19 and the trap is operated whereby the animal is captured.

From the preceding description it will be seen that the mole trap of this invention is strong and durable and possesses the important advantage of having a positive tripping device on each side thereof so that an animal passing through the burrow in either direction is sure to be caught on the impaling prongs.

Having thus specifically described and set forth the merits of this invention it is hereby claimed:

1. An animal trap comprising a recessed anchoring member, a frame secured to the anchoring member, a guide rod passing through said frame, an impaling member carried by said rod and movable within the limits of the recess, a coiled spring encircling said rod and adapted to depress the impaling member, the opposite ends of said spring being secured to the frame and the guide rod, means for holding the rod in elevated position, and an actuating yoke disposed on opposite sides of the trap in the path of the animal, said yoke being pivoted to the frame and operatively connected with the holding means.

2. An animal trap including an anchoring member, a frame carried by said member, a guide rod extending through said frame, a spring depressed impaling member depending from said rod, means for setting the impaling member in raised position, a tripping mechanism embodying coacting connected members adapted to be disposed in the path of the quarry and pivoted to the frame, a pin pivoted to the frame and operatively connected with the members, and means connecting said pin with the setting means.

3. An animal trap including a frame having an anchoring member depending therefrom, spring depressed impaling prongs mounted in the frame, a pivoted lever secured to the frame and adapted to maintain the prongs in raised position, a catch pivoted to the frame and engageable with the lever, coacting tripping members disposed on each side of the trap and secured to the frame, and a connecting rod operatively attached to the members and pivoted to the catch, said rod also constituting a stop to prevent said latch from alining itself with the frame and beyond the radius of engagement with the lever.

4. An animal trap including a frame having an anchoring member depending therefrom, spring depressed impaling prongs mounted in the frame, locking means for securing the prongs in raised position, coacting tripping plates disposed on each side of the trap in the path of the quarry, there being rigid connections between said plates on each side thereof, one of said connections being loosely journaled at its mid portion to the adjacent side of the frame, a transverse pin passing loosely through the mid portion of the other connection, said pin being pivoted for vertical movement to the frame, and a connecting rod depending from the locking means and passing through an aperture formed in the free end of the pin, said rod having a stop shoulder for engagement with the pin when the latter is pivoted upwardly through the action of the tripping plates.

In testimony whereof I affix my signature in presence of two witnesses.

JOSEPH C. BARKER. [L. S.]

Witnesses:
O. ROY FRANCIS,
ROBERT S. COMLY.

---

Copies of this patent may be obtained for five cents each, by addressing the "Commissioner of Patents, Washington, D. C."